Jan. 2, 1934.  F. RINGER  1,941,621
IGNITING STICK
Filed Feb. 21, 1930
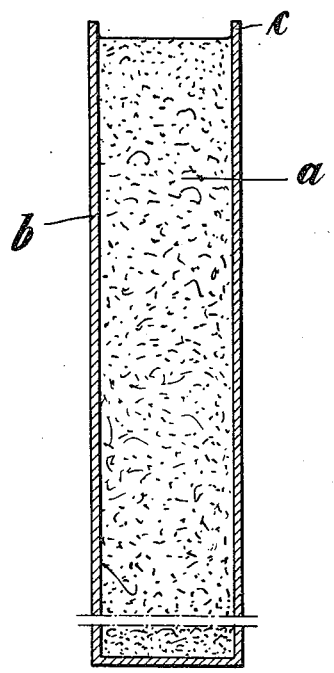
INVENTOR
FERDINAND RINGER
by his attorneys
Howson and Howson Patented Jan. 2, 1934

1,941,621

UNITED STATES PATENT OFFICE 1,941,621

IGNITING STICK

Ferdinand Ringer, Vienna, Austria

Application February 21, 1930, Serial No. 430,382, and in Austria January 16, 1930

40 Claims. (Cl. 52—27)

This invention relates to a combination of materials which may be molded into the form of a stick or like article, which may be repeatedly ignited and extinguished, the ignition being accomplishable by rubbing the article on a prepared surface, such as is known per se, and the extinguishing being accomplishable by waving the article back and forth rapidly in the air or by the blowing of a person's breath on the flame.

Heretofore efforts to accomplish the results of this invention have been made by building up an organic base mass from cellulose derivatives or the like and substances containing nitrogen, the latter being for the purpose of reducing the rate of combustion of the former. But, such efforts have not met with unqualified success because in some of the combinations the rate of combustion was still too high, while in other combinations such as acetylated cellulose or viscose, residues of combustion were formed which interfered with the operation of the article.

Now it has been discovered that these drawbacks may be avoided by using for building up the said organic base mass substantially only such solid high molecular substances which prior to pyrogenous formation of a residue, undergo a direct decomposition into simple molecule complexes or molecules which burn or evaporate without forming a residue. Preferably purely organic substances are used, but in some cases in such substances a comparatively small percentage of inorganic constituents may be contained in the form of chemical compounds such as salts. It has been found, that certain condensation or polymerization products of organic compounds, hereinafter in the specification and claims shortly designated as organic condensation products, are particularly suitable. The certain compounds of the general class just named, which are particularly suitable, are those in the form of high molecular solids which when moulded, have good mechanical properties and which on burning, when moulded, undergo prior to pyrogenous formation of a residue, a direct decomposition or dissociation into simpler molecule complexes or molecules capable of being burnt or evaporated without the formation of a residue. It is obvious, of course, that compounds which are hydroscopic will be unsuitable. I wish it to be understood that in this specification and in the claims I mean by pyrogenous formation of a residue a phenomen of destructive distillation to which are subjected the parts of the burning mass adjacent to the flame owing to the heat generated by the said flame before such adjacent parts are finally burnt as a result of complete oxidation. This phenomen consists in that in high molecular solid organic substances decompositions take place in which molten or sintered residual decomposition products are formed which in most cases are rich in carbon and which, owing to a reduced surface and reduced access of oxygen, resist complete combustion. The solid high molecular compounds to be used according to the invention, may for instance consist of condensation or polymerization products of formaldehyde. Substances are preferred which on combustion evolve decomposition products containing nitrogen or the like capable of reducing the rate or speed of combustion, such for instance as the condensation and polymerization products of formaldehyde and ammonia or the like. I have used with good success different of these products consisting essentially of polymerization products of aldehydes. I obtain excellent results by the use of hexamethylene tetramine or with mixtures of the same with other polymerization products of formaldehyde.

For these igniting sticks initial igniting substances are used which contain potassium chlorate and sulphur. It has been found that also other initial igniting substances may be used with advantage provided the heat developed on the combustion of the same is considerably less than that developed in the reaction of phosphorus and oxygen in which $P_2O_5$ is formed. It has been found advantageous to use of the substances required for securing sensitivity to friction, such for instance as sulphur, only the quantity just sufficient for such sensitivity. A quantity of sulphur amounting to about 1% and even less has been found sufficient.

It is advantageous to add to the base mass organic peroxides, good results have been obtained with benzoyle peroxide.

Consequently the igniting stick consists of sufficiently rapidly decomposing or dissociating organic condensation or polymerization products, the quantity thereof amounting to about more than one third by weight of the total mass, of oxygen carriers such as potassium chlorate, the quantity thereof amounting to about one third by weight of the total mass, of a substance producing sensitivity to friction the amount of such substance being less than 2% by weight of the total mass, the balance consisting of additions for improving certain properties such as powdered glass for increasing the sensitivity to friction, and such peroxides and the like for promoting combustion without the formation of a residue.

Such ignition sticks once ignited, continue to burn until they are completely consumed unless they be extinguished which may be done in the simplest manner by blowing them out. Means for reliably preventing the igniting sticks from continued burning, even if the extinction has been accidentally omitted, are desirable for the sake of safety, more particularly in the case of igniting sticks without holders.

Now it has been found that the extent of combustion of such igniting sticks may be controlled at will by providing the surface of the igniting stick with a coating consisting of a substance less readily combustible than the igniting stick or not at all combustible. The thickness of the coating varies on the one hand with the substance used and on the other hand with the period of time during which the igniting stick is required to burn after each ignition.

The coating to be used according to the invention may be applied to the igniting sticks for instance by dipping such sticks, after they have been moulded, pressed and if desired hardened, into suitable solutions of incombustible or difficultly combustible substances. The thickness of the coating or the quantity of the incombustible or difficultly combustible substance on the surface of the igniting stick may be determined by preliminary experiments in accordance with the desired duration of combustion. For instance the igniting sticks may be dipped repeatedly into solutions of the same concentration or the duration of combustions desired in any particular case may be determined by solutions differing in concentration the igniting sticks being dipped once only into such solution or in any other suitable manner.

*Example*

| | Parts by weight |
|---|---|
| Potassium chlorate | 35 |
| Calcium plumbate | 3.7 |
| Sulphur | 0.9 |
| Benzoyl peroxide | 3.7 |
| Powdered glass | 14.2 |
| Hexamethylene tetramine | 42.5 | are mixed with a small quantity of a solution of glue and if desired with a small quantity of formaline. The mixture is then moulded to sticks. If desired the sticks may be treated with gaseous formaldehyde but this is not absolutely necessary.

The sticks thus made are then coated with water glass for instance by dipping them into a water glass solution and finally dried. On rubbing the igniting stick thus finished on a suitable rubbing surface e. g. a rubbing surface known per se rich in phosphorous, the igniting stick is ignited and burns for a short time whereupon it extinguishes automatically and afterwards may be re-ignited in the same manner. The duration of each combustion may vary within relatively wide limits say from 2 to 20 seconds according to the concentration of the water glass solution.

In the annexed drawing I have shown by way of example a preferred constructional form of my improved igniting stick in longitudinal section on a somewhat enlarged scale.

(a) is a core made of combustible and ignitible mass such as hereinbefore described and (b) is the external water glass coating. On rubbing the stick on a suitable rubbing surface at a suitable point such as c of its outer free edges, the water glass coating is rubbed off at such point and the mass a is ignited and continues to burn until it has burnt away to a point below the point c whereupon it extinguishes automatically.

The size and shape of my improved igniting stick may vary within wide limits without departing from the essence of my invention.

What I claim is:

1. An igniting stick ignitible by friction comprising an organic base mass capable of burning at a low rate of combustion and an initial igniting mass uniformly intermixed with and distributed throughout the said base mass, the bulk of such base mass comprising organic condensation and polymerization products of aldehydes which prior to pyrogenous formation of a residue undergo under the action of the heat of the adjacent flame a decomposition into simpler molecules not capable of forming a residue under the action of heat, whereby said substances, when mixed and formed into a stick by themselves burn slowly but completely in the manner of solid alcohol.

2. An igniting stick ignitible by friction comprising an organic base mass capable of burning at a low rate of combustion and an initial igniting mass uniformly intermixed with and distributed throughout the said base mass, such base mass comprising at least one organic condensation product of an aldehyde, which prior to pyrogenous formation of a residue undergo under the action of the heat of the adjacent flame a decomposition into simpler molecules not capable of forming a residue under the action of heat.

3. An igniting stick ignitible by friction comprising an organic base mass capable of burning at a low rate of combustion and an initial igniting mass uniformly intermixed with and distributed throughout the said base mass, the bulk of such base mass comprising organic condensation products of formaldehyde and ammonia.

4. An igniting stick ignitible by friction comprising an organic base mass capable of burning at a low rate of combustion and an initial igniting mass uniformly intermixed with and distributed throughout the said base mass, the bulk of such base mass comprising hexamethylene tetramine.

5. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such base mass containing sulphur as a substance securing the sensitivity of such base mass to friction.

6. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat such base mass containing sulphur as a substance securing the sensitivity of such base mass to friction, the amount of sulphur not exceeding 2% by weight of the total base mass.

7. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such base mass containing organic peroxides.

8. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such base mass containing benzoyl peroxide.

9. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat and the said initial igniting mass consisting in its major part of substances capable of giving off oxygen and of small quantities of a substance securing the sensitivity to friction.

10. An igniting stick ignitible by friction comprising an organic base mass capable of burning at a low rate of combustion and an initial igniting mass uniformly intermixed with and distributed throughout the said base mass, such base mass comprising approximately 35 parts by weight of potassium chlorate, 42 parts by weight of hexamethylene tetramine, 3.7 parts by weight of benzoyl peroxide, 3.7 parts by weight of calcium plumbate, 0.9 parts by weight of sulphur and 14.2 parts by weight of powdered glass.

11. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such igniting stick being provided with a practically incombustible coating.

12. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such igniting stick being provided with a coating consisting of a silicate.

13. An igniting stick ignitible by friction comprising an organic base mass capable of burning at a low rate of combustion and an initial igniting mass uniformly intermixed with and distributed throughout the said base mass, the bulk of such base mass comprising aldehyde derivatives which prior to pyrogenous formation of a residue undergo under the action of the heat of the adjacent flame a decomposition into simpler molecules not capable of forming a residue under the action of heat, such igniting stick being provided with a coating consisting of water glass.

14. An igniting stick ignitible by friction comprising an organic base mass capable of burning at a low rate of combustion and an initial igniting mass uniformly intermixed with and distributed throughout the said base mass, the bulk of such base mass comprising hexamethylene tetramine, such igniting stick being provided with a coating of water glass.

15. A slow burning frictionally ignitible composition comprising an organic base mass capable of burning at a low rate of combustion, and an initial igniting mass uniformly intermixed with and distributed throughout the bulk of said base mass, said base mass consisting of aldehyde derivatives which, when molded in stick form, will undergo, prior to pyrogenous formation of a residue, under the action of the heat of an adjacent flame, a decomposition into simpler molecules not capable of forming a residue under the action of heat, in combination with binding and friction materials.

16. A slow burning frictionally ignitible composition the bulk of which comprising a base mass of a polymerization product of an aldehyde, which, when molded in stick form will undergo, prior to pyrogenous formation of a residue, under the action of the heat of an adjacent flame, a decomposition into simpler molecules not capable of forming a residue under the action of heat, in combination with an igniting mass uniformly intermixed with said base mass, and binding and friction materials.

17. A slow burning frictionally ignitible composition the bulk of which comprising a base mass of a condensation product of an aldehyde, which, when molded in stick form will undergo, prior to pyrogenous formation of a residue, under the action of the heat of an adjacent flame, a decomposition into simpler molecules not capable of forming a residue under the action of heat, in combination with an igniting mass uniformly intermixed with said base mass, and binding and friction materials.

18. A slow burning frictionally ignitible composition the bulk of which comprising a base mass of a condensation product of an aldehyde and ammonia, which, when molded in stick form will undergo, prior to pyrogenous formation of a residue, under the action of the heat of an adjacent flame, a decomposition into simpler molecules not capable of forming a residue under the action of heat, in combination with an igniting mass uniformly intermixed with said base mass, and binding and friction materials.

19. A slow burning frictionally ignitible composition the bulk of which comprising a base mass of a condensation product of formaldehyde and ammonia, and an igniting mass uniformly intermixed with said base mass, in combination with binding and friction materials.

20. A slow burning frictionally ignitible composition the bulk of which comprising a base mass of a condensation and polymerization product of aldehyde and ammonia, which, when molded in stick form will undergo, prior to pyrogenous formation of a residue, under the action of the heat of an adjacent flame, a decomposition into simpler molecules not capable of forming a residue under the action of heat, in combination with an igniting mass uniformly intermixed with said base mass, and binding and friction materials.

21. A slow burning frictionally ignitible composition the bulk of which comprising a base mass of a condensation and polymerization product of formaldehyde and ammonia, and an igniting mass uniformly intermixed with said base mass, in combination with binding and friction materials.

22. A slow burning frictionally ignitible composition comprising an organic base mass capable of burning at a low rate of combustion and an initial igniting mass uniformly intermixed with and distributed throughout the bulk of said base mass, said base mass consisting of aldehyde derivatives which, when molded in stick form, will undergo, prior to pyrogenous formation of a residue, under the action of the heat of an adjacent flame, a decomposition into simpler molecules not capable of forming a residue under the action of heat, in combination with binding and friction materials, and a substance to retard the combustion of the igniting mass.

23. A slow burning frictionally ignitible composition the bulk of which comprising a base mass of a polymerization product of an aldehyde which, when molded in stick form, will undergo, prior to pyrogenous formation of a residue, under the action of the heat of an adjacent flame, a decomposition into simpler molecules not capable of forming a residue under the action of heat, in combination with, and an igniting mass uniformly intermixed with said base mass, in combination with binding and friction materials, and a minor proportion of a substance to retard the combustion of the igniting mass.

24. A slow burning frictionally ignitible composition the bulk of which comprising a base mass of a condensation product of an aldehyde which, when molded in stick form, will undergo, prior to pyrogenous formation of a residue, under the action of the heat of an adjacent flame, a decomposition into simpler molecules not capable of forming a residue under the action of heat, in combination with, and an igniting mass uniformly intermixed with said base mass, in combination with binding and friction materials, and a minor proportion of a substance to retard the combustion of the igniting mass.

25. A slow burning frictionally ignitible composition comprising an organic base mass capable of burning at a low rate of combustion and an initial igniting mass uniformly intermixed with and distributed throughout the bulk of said base mass, said base mass consisting of aldehyde derivatives which, when molded in stick form, will undergo, prior to pyrogenous formation of a residue, under the action of the heat of an adjacent flame a decomposition into simpler molecules not capable of forming a residue under the action of heat, in combination with binding and friction materials, a substance to retard the combustion of the igniting mass, and a small proportion of a peroxide.

26. A slow burning frictionally ignitible positon comprising a base mass of a polymerization product of an aldehyde which, when molded in stick form, will undergo, prior to pyrogenous formation of a residue, under the action of the heat of an adjacent flame, a decomposition into simpler molecules not capable of forming a residue under the action of heat, in combination with, and an igniting mass uniformly intermixed with said base mass, in combination with binding and friction materals, and a minor proportion of a substance to retard the combustion of the igniting mass, and a small proportion of a peroxide.

27. A slow burning frictionally ignitible compositon comprising an organic base mass capable of burning at a low rate of combustion and an initial igniting mass uniformly intermixed with and distributed throughout the bulk of said base mass, said base mass consisting of aldehyde derivatives which, when molded in stick form, will undergo, prior to pyrogenous formation of a residue under the action of the heat of an adjacent flame a decomposition into simpler molecules not capable of forming a residue under the action of heat, in combination with binding and frict'on materials, and a minor proportion of calcium plumbate to retard the combustion of an igniting mass.

28. A slow burning frictionally ignitible composition comprising an organic base mass capable of burn'ng at a low rate of combustion and an initial igniting mass uniformly intermixed with and distributed throughout the bulk of said base mass, said base mass consisting of aldehyde derivatives which, when molded in stick form, will undergo, prior to pyrogenous formation of a residue, under the action of the heat of an adjacent flame, a decomposition into simpler molecules not capable of forming a residue under the action of heat, in combination with binding and friction materials, a small proportion of calcium plumbate to retard the combustion of the igniting mass, and a small proportion of a peroxide.

29. A slow burning frictionally ignitible composition, the bulk of which comprises an organic base mass consisting of a polymerization product of an aldehyde which, when molded in stick form, will undergo prior to pyrogenous formation of a residue under the action of the heat of an adjacent flame, a decomposition into simpler molecules not capable of forming a residue under the action of heat, in combination with an initial igniting mass and friction materials.

30. A slow burning frictionally ignitible composition comprising, in the approximate proportions stated, a polymerization product of an aldehyde in the neighborhood of 42.5%, said polymerization product, when molded in stick form, undergoing, prior to pyrogenous formation of a residue, under the action of the heat of an adjacent flame, a decomposition into simpler molecules not capable of forming a residue under the action of heat, igniting and friction materials in the neighborhood of 50%, the remainder being substances to improve combustion without leaving residue.

31. A slow burning frictionally ignitible composition the bulk of which comprises an organic base mass consisting of a polymerization product of an aldehyde which, when molded in stick form, will undergo prior to pyrogenous formation of a residue under the action of the heat of an adjacent flame, a decomposition into simpler molecules not capable of forming a residue under the action of heat, in combination with an initial igniting mass, binding and friction materials, and substances to improve the combustion without leaving a residue.

32. A slow burning frictionally ignitible composition comprising, in the following proportions, a polymerization product of an aldehyde about or slightly more than one third, said polymerization product, when molded in stick form, undergoing, prior to pyrogenous formation of a residue, under the action of the heat of an adjacent flame, a decomposition into simpler molecules not capable of forming a residue under the action of heat, oxygen carries about one third, substance sensitive to friction 2% or less, the remainder comprising friction substances and substances promoting combustion without formation of residue.

33. A slow burning frictionally ignitible composition comprising an organic base mass capable of burning at a low rate of combustion, and an initial igniting mass, the bulk of said base mass consisting of aldehyde derivatives which when molded in stick form, will undergo, prior to pyrogenous formation of a residue, under the action of the heat of an adjacent flame, a decomposition into simpler molecules not capable of forming a residue under the action of heat, in combination with binding and friction materials.

34. A slow burning frictionally ignitible composition the bulk of which comprises a base mass of a condensation product of an aldehyde, which, when molded in stick form, will undergo, prior to pyrogenous formation of a residue, under the action of the heat of an adjacent flame, a decomposition into simpler molecules not capable of forming a residue under the action of heat, in combination with an igniting mass and binding and friction materials.

35. An igniting stick ignitible by friction comprising an organic base mass capable of burning at a low rate of combustion and an initial igniting mass, the bulk of such base mass comprising organic condensation and polymerization products of aldehydes which, prior to pyrogenous formation of a residue, undergo under the action of the heat of the adjacent flame, a decomposition into simpler molecules not capable of forming a residue under the action of heat, whereby said substances, when mixed and formed into a stick by themselves burn slowly but completely in the manner of solid alcohol.

36. A slow burning frictionally ignitible composition comprising an organic base mass capable of burning at a low rate of combustion and an initial igniting mass, such base mass being approximately one third part by weight of the total mass and comprising an aldehyde derivative which, when molded into stick form, will undergo prior to pyrogenous formation of a residue under the action of the heat of an adjacent flame, a decomposition into simpler molecules not capable of forming a residue under the action of heat, the initial igniting mass being approximately one third part by weight of the total mass and comprising a substance capable of giving off oxygen plus an addition of less than 2% of the total mass of a substance securing the sensitivity to friction, the balance of the composition including organic peroxides.

37. A composition as described in claim 33 formed into a stick which has a coating of a combustible substance ignitible by the flame of said stick but which is less readily combustible than said stick.

38. A composition as described in claim 34 formed into a stick which has a coating of a combustible substance ignitible by the flame of said stick but which is less readily combustible than said stick.

39. A composition as described in claim 35 formed into a stick which has a coating of a combustible substance ignitible by the flame of said stick but which is less readily combustible than said stick.

40. An igniting stick as described in claim 4 which has a coating of a combustible substance ignitible by the flame of said stick but which is less readily combustible than said stick.

FERDINAND RINGER.

CERTIFICATE OF CORRECTION.

Patent No. 1,941,621.                    January 2, 1934.

FERDINAND RINGER.

It is hereby certified that error appears in the printed specification of the above numbered patent requiring correction as follows: Page 3, lines 109, 120, 131, 142 and 148, and page 4, line 10, claims 16, 17, 18, 19, 20 and 21, respectively, for "comprising" read comprises; page 3, line 99, claim 15, and page 4, lines 20, 60, 89 and 104, claims 22, 25, 27 and 28, respectively, strike out the words "the bulk of" and insert the same before "said" in lines 100, 21, 61, 90 and 105, of said claims; and that the said Letters Patent should be read with these corrections therein that the same may conform to the record of the case in the Patent Office.

Signed and sealed this 23rd day of January, A. D. 1934.

F. M. Hopkins (Seal)                                              Acting Commissioner of Patents.